Sept. 27, 1932.  F. W. YOUNG  1,880,006
FILTER CAKE TREATING DEVICE
Original Filed Nov. 4, 1926    3 Sheets-Sheet 1
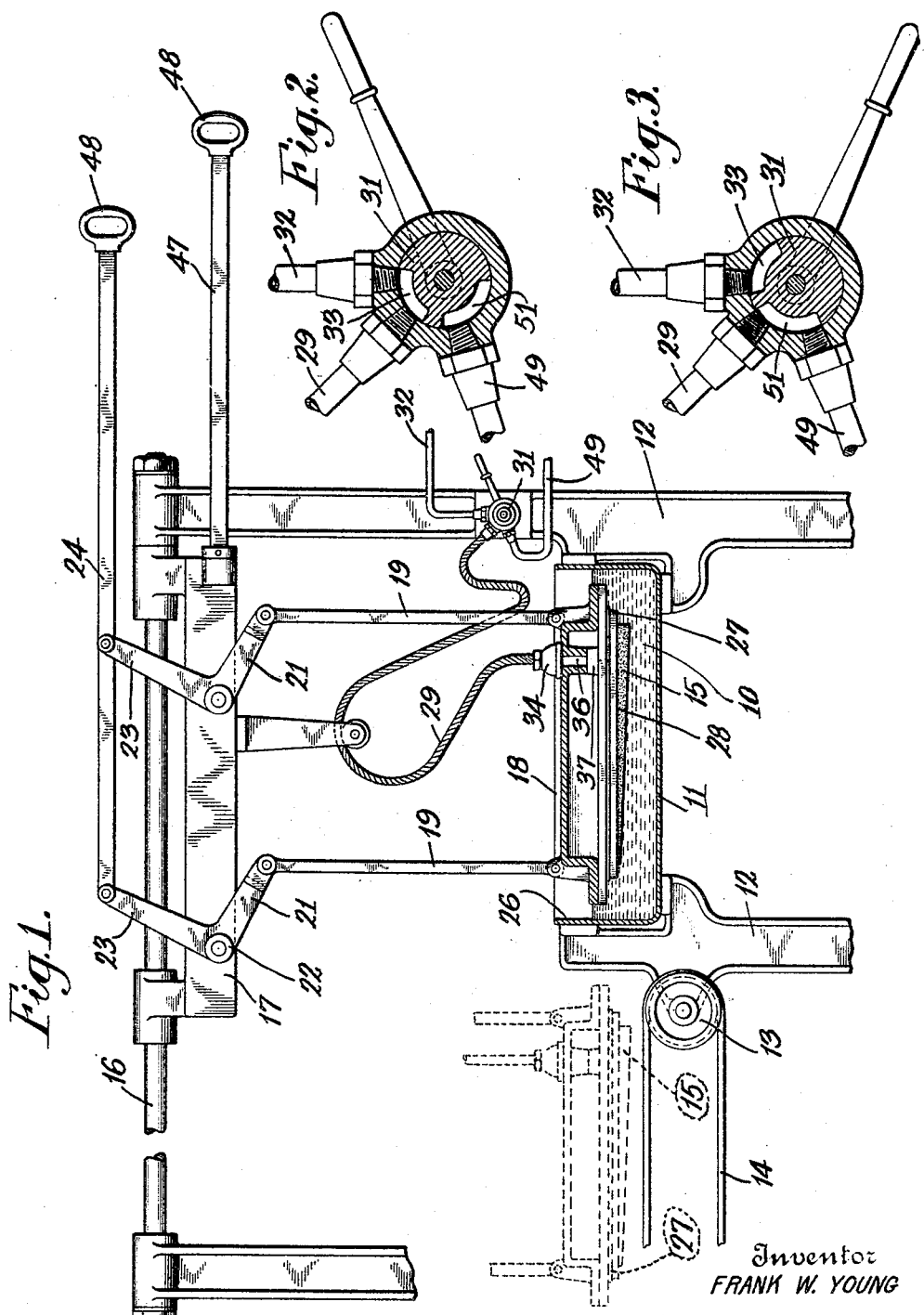
Inventor
FRANK W. YOUNG
By his Attorneys
Bohleber & Ledbetter Sept. 27, 1932.     F. W. YOUNG     1,880,006
FILTER CAKE TREATING DEVICE
Original Filed Nov. 4, 1926     3 Sheets-Sheet 2
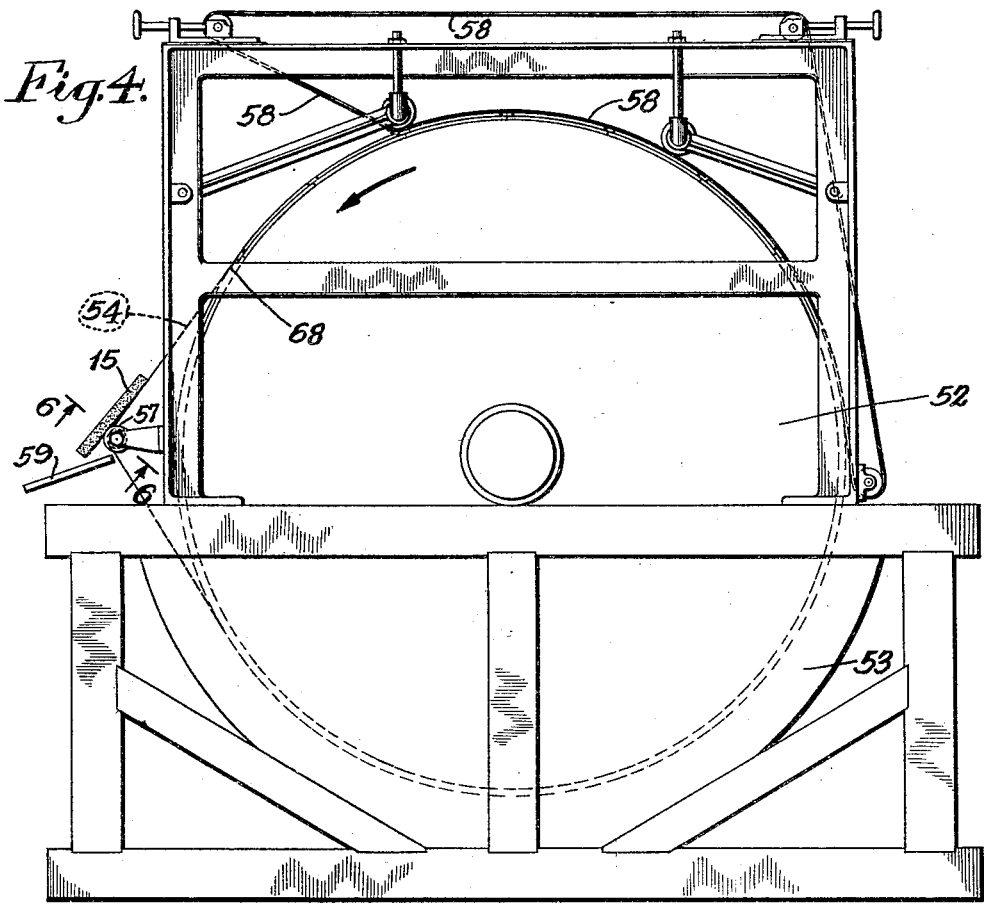
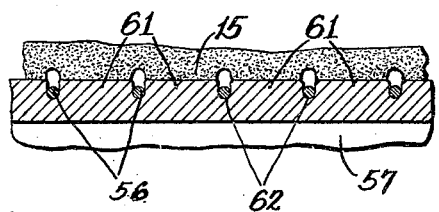
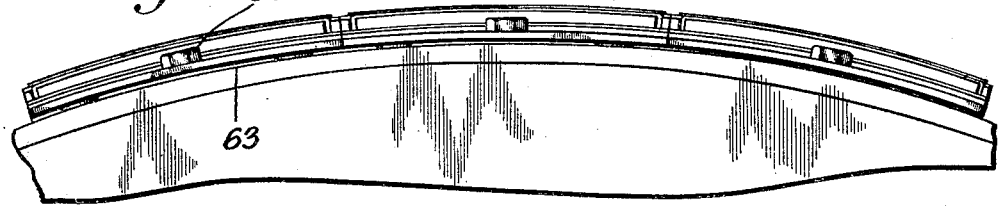
Inventor
FRANK W. YOUNG
By his Attorneys
Bohleber & Ledbetter Sept. 27, 1932.   F. W. YOUNG   1,880,006
FILTER CAKE TREATING DEVICE
Original Filed Nov. 4, 1926   3 Sheets-Sheet 3
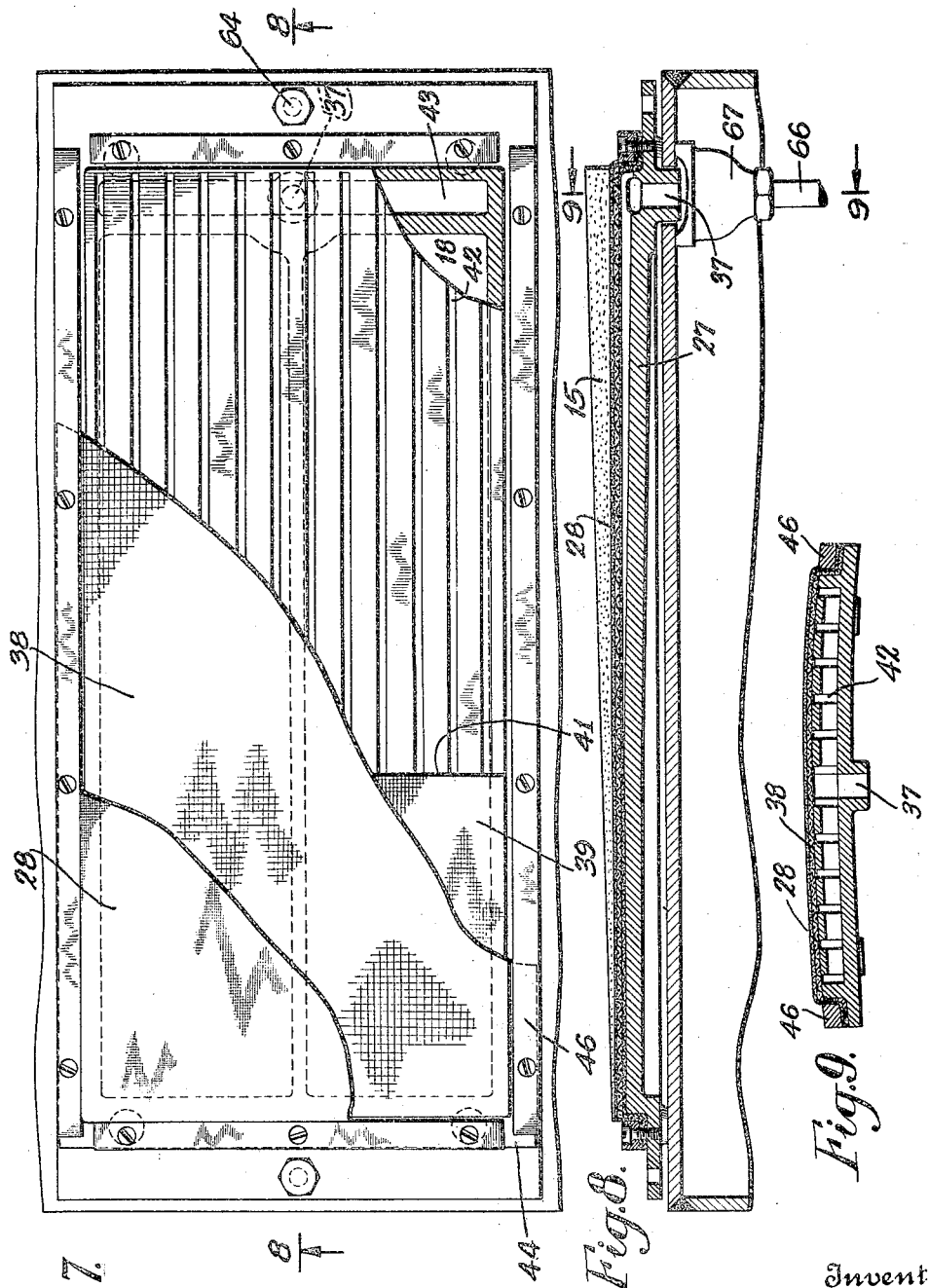
Inventor
FRANK W. YOUNG
By his Attorneys
Bohleber + Ledbetter Patented Sept. 27, 1932

1,880,006

UNITED STATES PATENT OFFICE

FRANK W. YOUNG, OF UPPER MONTCLAIR, NEW JERSEY

FILTER CAKE TREATING DEVICE

Application filed November 4, 1926, Serial No. 146,086. Renewed July 14, 1931.

This invention relates broadly to instrumentalities for and methods of forming a deposit of solids from a fluid in which such solids are suspended.

The primary object of the invention is the attainment of variations in the characteristics, such as, for instance, the depth, density, porosity, quality or other attributes of a deposit of solids from a fluid in which the said solids are in suspension. Accordingly, the formation of the deposit of the solids is regulated or controlled to enable the deposit to assume the desired characteristics.

In one of its many aspects the invention relates to filtering means and what may be broadly termed methods of filtration and seeks in accordance therewith, the attainment of predetermined or desired characteristics in filter cake. These are attained broadly by controlling or regulating the formation of the filter cake.

The deposit of solids from a liquid in which they are suspended is effected, in filtration, by the flow of the liquid, induced by a differential of pressure, or vacuum, through a filtering medium upon which the solids are deposited. The rate of deposit is proportional to the rate of flow of the filtrate, among other factors or the rate of flow of the fluid through the interstices of the deposit already formed or its rate of flow through the filtering medium and the amount of the deposit is, of course, proportional to the rate of deposit in a given time interval. Cake density is also dependent upon the rate of deposit. Accordingly, therefore, the principal object of this aspect of the present invention, to wit, the control of the character of the filter cake, for instance its depth, is effected by controlling the rate of flow of the fluid vehicle for the solid particles and variations in the said character of the filter cake are effected by varying the concurrent rate of flow at predetermined points in the zone of cake formation.

For instance, where a filter cake of gradually varying depth is desired, the rate of flow of the filtrate through the filtering medium may be progressively varied. One method of accomplishing this gradual variation is to progressively vary the porosity of the filter medium, as between predetermined points, so that the flow of filtrate through the filtering medium will be progressively retarded. Another method of varying the rate of deposit of precipitate is to retard the flow of filtrate away from the filtering medium to a different degree at different points in the filtering zone so that the filtrate backs up at predetermined points and retards the passage of the fluid through the filtering medium and hence retards the rate of deposit of solid particles. Conversely the flow of filtrate through or away from the filtering medium may be accelerated in varying degrees, as progressively, between predetermined points, to attain similar results. More particularly drainage means affording a passage or space beneath the filtering medium through which the filtrate flows therefrom is obstructed in different degrees in a predetermined manner, as progressively, so that the flow of filtrate from one portion of the zone of filtration occurs at a slower rate than the flow of filtrate from an adjacent portion, or vice versa.

The invention also seeks to provide an improved instrumentality especially applicable to filtering means whereby the control of the characteristic of the filter cake may be effected in a practical and advantageous manner. To this end a drainage member, as it may be called, is provided over which the filter cloth is stretched, which drainage member is so designed as to facilitate the flow of filtrate from those parts of the filtering zone in which a thick or dense cake is desired while retarding to a predetermined degree the flow from those portions where a thinner or less dense filter cake is desired. More particularly the drainage member is formed as a unit, such as a single casting, adapted to lie beneath the filter cloth and is formed with a plurality of grooves increasing in depth toward a common outlet for the filtrate. Over the drainage member is stretched the filter cloth which is spaced therefrom by suitable reenforcing and screening media which may also be availed of to afford a greater retardation in the flow of filtration away from the filtering medium than is obtained in some instances by the grooves.

The invention also has for its object the formation of a deposit which varies in thickness in a predetermined manner and the subsequent utilization of the deposit so formed. To this end an instrumentality utilizing the principles hereinbefore discussed is availed of in the manufacture of shingles, clapboard and other tapered plates, slabs, sheets and the like of composite material.

One of the drainage members combined with filtering means may be removably mounted in relation to a container of fluid in which solid particles are suspended so that the device may be alternately submerged in the fluid and removed therefrom for the deposit of a tapered sheet of cake individually or in a stack or upon a conveyor. In its simplest aspect, the equalization of pressure, as by stopping the suction, may be sufficient to cause the release of the sheet of cake from the filtering means, or a blast of gas in a reverse direction may be availed of to discharge the cake.

One or more drainage members, combined with filtering means, may be associated with means to remove the tapered sheet deposit. This sheet deposit is afterwards dried and/or treated and may be used, for instance, as a shingle or clapboard. The invention also has as an object a practical instrumentality and method for the continuous and automatic or semi-automatic manufacture of the tapered sheets. A continuous rotary type drum filter may be availed of, constantly turning in a tank of liquid, in which the solids, of which the tapered sheet is to be formed, are suspended. Beneath the filter medium, carried with the rotary filter, there may be disposed suitable drainage means, preferably a drainage member as hereinbefore described, and associated with the filter drum is a cake reenforcing and stripping member or conveyor whereby the tapered sheets may be automatically removed for subsequent processing. In the preferred form of the invention, the reenforcement for the sheets comprises a plurality of separate, spaced, independent and preferably continuous members or strands about which the filter cake is formed and by which the tapered sheets are removed from the drum. So soon as the sheets leave the drum they are freed from the carrier for subsequent processing.

These and other objects of the invention and the means for their attainment will be more apparent from the following detailed description taken in connection with the accompanying drawings illustrating a preferred embodiment of the invention, in which:

Figure 1 is a view, in front elevation and partly in section, showing one form of instrumentality by which the objects of the present invention may be realized.

Figure 2 is a view, partly in section, showing a valve in operative position to induce a flow of filtrate, through the filtering medium illustrated in Figure 1, by a reduction in pressure.

Figure 3 is a view of the same valve shown in Figure 2 but with the parts arranged to permit a blast of air in reverse direction to discharge the cake from the filtering medium.

Figure 4 is a view, in end elevation, showing one form of continuous rotary drum type filter to which the invention may be applied.

Figure 5 is a view showing a fragmentary portion of the end of a filter drum and the drainage members disposed thereabout to form the peripheral surface.

Figure 6 is a view showing a fragmentary portion of the stripping roll, in longitudinal section, taken in the plane indicated by the line 6—6 in Figure 4, looking in the direction of the arrows.

Figure 7 is a view showing a fragmentary portion of the filter element shown in Figure 1 or the peripheral surface of the filter leaf or drum, parts of the filtering media being broken away to show the drainage members according to the present invention.

Figure 8 is a transverse vertical sectional view taken in the plane indicated by the line 8—8 in Figure 7 looking in the direction of the arrows and showing a drainage member in place on the filter leaf or drum, the filtering media and a filter cake built up thereon which varies in depth from one side to the other.

Figure 9 is a sectional view taken in the plane indicated by the line 9—9 in Figure 8 looking in the direction of the arrows.

Primarily the characteristics, i. e. the depth, density, etc. of a cake of deposit 15 are controlled by controlling the rate of deposit of the solids on the filtering medium. This rate of deposit is proportional to the rate of flow of the filtrate away from the filter medium. Broadly, therefore, the principal object of the invention is achieved by any means whereby the rate of flow of the filtrate is controlled and to vary the characteristics of the filter cake 15 at different parts of the filtering zone the flow of the filtrate from such points is controlled either retarded or accelerated to a different degree.

Figure 1 illustrates one instrumentality by which the invention may be realized in a simple manner. A fluid containing solid particles in suspension is illustrated at 10 within a container or tank 11 supported upon the frame 12 of the machine or instrumentality as a whole. Pivoted upon the frame adjacent the tank is a pulley 13 about which an endless conveyor 14 is adapted to move for the purpose of carrying away the discharged sheets of cake 15, immediately above the tank 11 and extending over a portion of the conveyor 14 is a shaft or track 16 upon which is slidable a carriage 17 supporting the deposit forming instrumentality according to the present invention.

A support or filter leaf 18 is pivotally suspended by the links 19 from arms 21 of bell cranks 22 pivoted upon the carriage 17, the respective other arms 23 of which are connected together for manual operation by a rod or link 24 to rotate the bell cranks 22 in a counter clockwise direction to raise the support 18 out of the fluid 10 to a point above the walls 26 of the tank 11. The carriage 17 may then be reciprocated along the shaft 16 to the position indicated in dotted lines at the left of Figure 1, where the cake 15 may be discharged either in a stack or individually, if desired, upon a conveyor.

Reference will now be had (Figures 7, 8 and 9) to the drainage member 27 whereby the new and improved results according to the present invention are attained by which one of the methods of forming a cake of varying depth may be carried out. The slurry 10, as it may be called, in description of any liquid containing solid particles in suspension, is disposed within a container or tank 11, and is drawn through a filter cloth 28 and leaves the solids deposited thereon in the form of cake 15. This is effected by a differential of pressure between the two surfaces of the filter medium 28. Referring specifically to Figure 1, a reduction in pressure may be caused on the inner (or upper as viewed in that figure) side of the drainage member 27 by connecting the tube or conduit 29, by means of a valve 31, to an air exhausting pump not shown, the position of the valve to establish this relation being illustrated in Figure 2 wherein it will be seen that the pipe 32 leading to the pump and the pipe 29 leading to the filter leaf 18 are in communication by the passage 33 formed in the valve 31.

The pipe 29 is connected by a coupling 34 to a passage 36 formed in the support or filter leaf 18 which passage 36 communicates with a receiver 37 formed on the drainage member 27. Due to the differential in pressure, the filtrate is caused to pass or is drawn through the filter cloth 28 and also passes through a supporting and protecting layer 38 of coarse weave which permits the flow of filtrate from the filter cloth 28. A second screen 39 (which may be called a drainage screen), terminates at such point, say 41, that it covers a portion of the width of the drainage member. The drainage screen 39 permits drainage over that area to a limited extent. In other words it retards the flow of filtrate and the filter cake 15 deposited thereabove is formed very slowly. From the edge of the screen 39 the drainage member 27 is formed with a plurality of drainage grooves or passages 42 through which the filtrate flows. The flow through the drainage grooves 42 is accelerated over that through the meshes of the screen 39 but is varied by retarding it nearest the edge 41 of the screen 39 to a transverse receiving passage 43 into which all of the drainage grooves 42 empty and which in turn communicates with a receiver 37 to empty the filtrate into the pipe, say 29.

As shown in Figures 7, 8 and 9 the filter cloth 28 is secured in position on the drainage member 27 by causing the edges thereof to overlie a flange 44 formed along each side of the drainage member 27 and securing or clamping the edges of the drainage cloth 39 to the flange by means of strips or bars 46 of metal screwed to the flange as shown.

After the formation of cake 15 of plastic material on the submerged drainage member 27 the sheet of cake 15 may be removed and discharged in the following manner. The rod 24 is pushed toward the left, as viewed in Figure 1, rotating the bell cranks 22 about their pivots and lifting the filter leaf 18 and with it, of course, the drainage member 27 and cake deposit 15 on the filter medium 28 carried thereby out of the container 11 of fluid 10 and above the walls 26 of the container. While in this position suspended in the air above the tank 11 the carriage 17 is moved along the track 16 to the left hand side of the machine 12 as viewed in Figure 1 as by the rod 47 where it is lowered again to the position indicated in dotted lines in Figure 1 by moving the rod 24 to the right. In the illustrated embodiment the rods 24 and 47 are shown as provided with handles 48 for manual operation but it will be obvious that suitable timing mechanism such as cams or the like may be availed of to control the elevation and translation of the support 18 to provide automatic operation of the machine.

When the filter leaf 18 reaches the position indicated in dotted lines in Figure 1 the suction is released by rotation of the valve 31 to cut out the pump. The sheet of deposit may fall of its own weight upon a support, a stack of sheets already made, or upon a conveyor of any character, such as the endless belt 14 shown in the drawings.

To assist the discharge of the sheet 15, a blast of air may be forced through the filter cloth 28 in a direction opposite to that normally taken by the filtrate under the influence of the pressure differential. In this event the air may be drawn from or through a pipe 49 from any suitable source of pressure, such as a reservoir or pump, not shown, and directed by proper movement of the valve 31 to the pipe 29 leading to the filter leaf 18. As shown in Figure 3, the valve 31 is provided with a second passage 51 which connects the air pipe 49 and the conduit 29 to the filter leaf 18.

Obviously the valve 31 may be controlled automatically in synchronism with automatic operation of the elevating and translating mechanism.

After the cake 15 has been discharged the filtering element 18 may be returned to the tank 11 by a series of movements the reverse of that just described.

A modification of the invention is illustrated in Figures 4 and 5 wherein a continuous rotary drum type filter 52 is adapted to form tapering sheets of cake 15 of desired shape which can be removed as such, subsequently treated and dried and used for a variety of purposes.

The filter drum 52 turns in a tank 53 of slurry and has passed around it a filter cake reinforcement or reenforcing or stripping member 54 comprised, in this instance, of a plurality of endless spaced and parallel strands 56 also passing about a grooved roller 57. The particular type of reinforcement 54, per se, forms no part of the present invention save in so far as it enters into the combination for the especial purpose as herein described. Suffice it to say that the filter cake 15 is built up in a unitary mass of desired shape by the deposit of the solid particles about the separate strands 56 which lie upon the surface of the filter cloth 28, is compressed by the flexible cake compressor belt 58 and the mass is carried away or removed from the filter drum 52 by the reinforcement 54 as a unit while preserving its shape when the suction in the drum is released, i. e., the vacuum relieved. The reinforcing strands 56 burdened with the filter cake 15 pass to the roller 57 where the sheet of cake 15 is discharged while preserving its shape upon a receiving surface 59 being pried from the strands 56 by the projecting portions 61 of the roller 57 between the grooves 62 thereof in which the respective strands 56 lie.

The periphery 63 of the drum 52 carries a plurality of drainage members 27 similar to that just described which extend lengthwise of the drum 52, that is, in the direction of its axis. They are shown secured at their respective ends to the peripheral surface 63 by say a machine screw 64 at each end.

The slurry in the tank is drawn through a filter cloth and passes through the flow impeding structure or drainage member 27 as hereinbefore described in connection with Figure 1 as is usual in rotary type filters. A plurality of pipes 66 are connected to a plurality of receivers 67, respectively, which pipes are controlled by valves or the equivalent similar to the valves 31, not shown, and which operate automatically, so that suction may be applied to those areas of filter cloth submerged in the slurry while the suction is released at the point, say 68, where the cake 15 leaves the drum 52.

When it is desired to form the filter cake 15 in separate sheets and remove it as such, the drainage members 27 may have dead spaces between them as they lie upon the periphery of the drum, above which no filter cake 15 forms. This is particularly advantageous where tapered shingles and the like are to be manufactured. It will be observed that each drainage member 27 is formed with a flange 44 about its edge as previously described by means of which it is bolted to the peripheral surface of the filter drum, and circumferentially, the filtering area is spaced from adjacent filtering areas to form the dead spaces.

Thus a separate sheet of filter cake 15 is formed over each drainage member 27 and may be removed as such due to the fact that the cords 56 are embedded therein. At the stripping device 57 the sheets, as such, are pried from the reenforcement 56 and delivered onto any sort of means which will convey the same away from the filter.

The subject matter of the present invention is particularly useful in the manufacture of composition shingles or clapboards, where a tapered product is desired. Thus a slurry containing asbestos fibre cement, sand and if desired, coloring fragments or other matter may be utilized in the tank 11 or 53 and the asbestos composition deposited, in the form of a tapered sheet, on the filtering medium 28 about the spaced strand reenforcement 54 in the form of a filter cake 15, the liquid passing through the filter medium as filtrate.

It will thus be seen that methods of and an instrumentality or vacuum chamber has been provided for the control of the flow of filtrate through a filter medium whereby the flow may be varied between predetermined points to attain desired characteristics in a cake formed by the deposit of solids from a fluid in which the solids are suspended. The flow control member or drainage member is applicable to different types of deposit forming instrumentalities in carrying out one method of controlling the formation of a cake.

No limitation is intended, by the foregoing description or accompanying illustrations, in the broad concept of the invention involving the method of controlling the characteristics of the filter cake as from what has been pointed out hereinbefore it will be obvious that the control of the deposit of solid particles may be effected in a number of different ways. Reference will be had to the appended claims for a delineation of the scope of the invention.

What I claim is:

1. In a device for causing the deposit of solid particles from a liquid in which they are suspended, means for varying the rate of deposit of the said particles simultaneously at predetermined points in the deposit.

2. In a device for causing the deposit of solid particles from a fluid in which they are suspended, a deposit causing means and means to progressively retard the formation of the deposit between predetermined points.

3. In a device for causing the deposit of solid particles from a fluid in which they are suspended, a deposit causing means and means to progressively accelerate the formation of the deposit between predetermined points.

4. In a filter, in combination, a filter medium and means to progressively retard the deposit of precipitate between predetermined points.

5. In a continuous filter, in combination, a filter medium and means to vary the formation of filter cake on the filter medium.

6. In a continuous filter having a drum rotating in a tank, in combination, a section of filtering medium disposed over the peripheral surface thereof, means to conduct filtrate from the said section, and means to vary the flow of filtrate from different portions of the section.

7. In a continuous filter having a drum rotating in a tank, in combination, a plurality of sections of filter medium disposed over the peripheral surface of the drum, means to permit the flow of filtrate from the respective sections and means to progressively retard the said flow.

8. In a filter, a drainage member adapted to lie beneath the filter medium and receive filtrate therefrom including an outlet, a plurality of paths for the flow of filtrate to the outlet and means to progressively retard the said flow in the respective paths.

9. In a filter having a filter medium, a drainage member adapted to lie beneath the filter medium and receive filtrate therefrom including outlet means, a plurality of paths for the flow of filtrate to said outlet means and means to gradually facilitate the flow of filtrate toward the outlet.

10. In a continuous filter having a drum rotating in a tank, in combination, a plurality of sections of filter medium disposed over the peripheral surface of the drum, means to permit the flow of filtrate from the respective sections, and means to retard the flow of filtrate through the filter medium of each section at predetermined points.

11. In a continuous filter having a drum rotating in a tank, in combination, a plurality of sections of filter medium disposed over the peripheral surface of the drum, means to permit the flow of filtrate from the respective sections, and means to retard the said flow of filtrate at predetermined points to a predetermined degree.

12. In a filter, a drainage member adapted to underlie the filter medium and receive filtrate therefrom including outlet means, means to permit the flow of filtrate with respect to the drainage member to the outlet means and means to progressively facilitate the flow of filtrate toward the outlet means.

13. Filter means, comprising in combination, a filter medium, coarse mesh means underlying the filter medium to permit the flow of filtrate therefrom, a finer mesh means underlying a portion of the coarse mesh means to retard the flow of filtrate therefrom and a drainage member underlying both said means and means to progressively facilitate the flow of filtrate.

14. In filtering means, in combination, a filtering medium, means to cause a differential in pressure on opposite sides of the medium, a fluid container within which the medium is adapted to be submerged periodically and means to vary the deposit of solids on the filter medium.

15. In a filter, a drainage member adapted to lie beneath the filter member and receive filtrate therefrom including an outlet, a plurality of paths for the flow of filtrate to the outlet and means to vary the flow.

16. In a filter having a support movable into and out of a tank, a section of filter medium disposed on the support, means to permit the flow of filtrate from the section of filter medium and means to retard the flow of filter through the filter medium at predetermined points.

17. In filtering means, in combination, a filtering medium, means to cause a differential in pressure on opposite sides of the medium, a fluid container within which the medium is adapted to be disposed and means to vary the deposit of solids on the filter medium from a fluid in the container.

18. In filtering means, in combination, a filtering medium, means to cause a differential in pressure on opposite sides of the medium, a fluid container within which the medium is adapted to be submerged periodically and means to vary the deposit of solids on the filter medium from a fluid in the container.

19. The method of varying the characteristics of a deposit of solid particles from a fluid in which said particles are suspended consisting of inducing a flow of fluid through the interstices of a mesh and retarding the flow of fluid at predetermined points.

20. The method of varying the characteristics of a deposit of solid particles from a fluid in which said particles are suspended consisting of inducing a flow of fluid through the interstices of a mesh and retarding the flow of fluid progressively between predetermined points.

21. The method of varying the characteristics of a deposit of solid particles from a fluid in which said particles are suspended consisting of inducing a flow of fluid through the interstices of a mesh and retarding the flow of fluid away from the mesh at predetermined points.

22. The method of varying the characteristics of a deposit of solid particles from a fluid in which said particles are suspended consisting of inducing a flow of fluid through the interstices of a mesh and progressively accelerating the flow of fluid between predetermined points.

23. In a shingle machine, means for causing the deposit of a composition, from a liquid in which it is suspended and means for varying the rate of deposit of the said composition at predetermined points.

24. In a shingle machine, means for causing the deposit of asbestos, sand and cement from a fluid in which they are suspended, and means to progressively retard the formation of the deposit between predetermined points.

25. In a machine for manufacturing asbestos shingles, in combination, a tank, a drum rotating in the tank, a section of filter cloth disposed over the peripheral surface of the drum, means to conduct filtrate from the said section, and means to vary the flow of filtrate from different portions of the section.

26. In a machine for manufacturing asbestos shingles, a rotating filter drum, a tank in which the drum rotates, a plurality of sections of filter medium disposed over the peripheral surface of the drum, means to permit the flow of filtrate from the respective sections and means to progressively retard the said flow.

27. In a machine for manufacturing composition tapered shingles, a filter medium, a drainage member adapted to lie beneath the filter medium and receive filtrate therefrom including an outlet, a plurality of paths for the flow of filtrate to the outlet and means to progressively retard the said flow.

28. A drainage member for filtering means formed with a plurality of adjacent substantially parallel drainage grooves, a receiving basin common to the grooves and an outlet.

29. A drainage member for filtering means formed with a plurality of substantially parallel drainage grooves varying in depth, a receiving groove into which the lowest portion the drainage grooves empty, and outlet and means to secure fabric to the surface in which the grooves are formed.

30. A mechanism for forming plastic material into plates, slabs and the like, comprising a member having a vacuum chamber forming said plastic material into a unitary mass of desired shape, cords associated therewith adapted to remove said mass as a unit while preserving its shape, and means whereby a vacuum in said chamber effects the holding of said plastic material to said cords.

31. A mechanism for forming plastic material into plates, slabs and the like, comprising a member having a vacuum chamber forming said plastic material into a unitary mass of desired shape, cords associated with said chamber adapted to remove said mass as a unit while preserving its shape, and perforated means interposed between said cords and chamber.

32. A mechanism for forming plastic material into plates, slabs and the like, comprising a member having a vacuum chamber forming said plastic material into a unitary mass of desired shape, cords adapted to remove said mass as a unit while preserving its shape, and vacuum controlled means for drawing liquid from plastic material on said cords.

33. A mechanism for forming plastic material into plates, slabs and the like, comprising a member having a vacuum chamber forming said plastic material into a unitary mass of desired shape and cords removably associated therewith adapted to remove said mass as a unit while preserving its shape, and means whereby a vacuum in said chamber effects holding of plastic material to said cords, said cords being removable upon relieving the chamber of its vacuum.

34. A mechanism for forming plastic material into plates, slabs and the like, comprising a member having a vacuum chamber forming said plastic material into a unitary mass of desired shape, filtering means covering said chamber, and flexible cords supportable on said filtering means separable therefrom and adapted to remove said mass as a unit while preserving its shape.

35. A mechanism for forming plastic material into plates, slabs and the like, comprising a member having a vacuum chamber forming said plastic material into a unitary mass of desired shape, filtering means covering said chamber, a series of flexible cords above said filtering means adapted to remove said mass as a unit while preserving its shape, and means for suitably supporting said cords, whereby when said chamber is subjected to a vacuum said cords will be held tightly in position against said member.

36. A device for forming tapered shingles from plastic material, comprising a plastic material tank and a rotatable drum having vacuum chambers therein for forming said plastic material into a unitary mass, cords carried by said drum over said chambers and to be passed through material in said tank, and means whereby material is deposited on said cords in varying thicknesses when said cords pass through the plastic material tank.

37. A machine for forming tapered shingles from plastic material, comprising a drum having vacuum passages therein for forming said plastic material into a unitary mass, flexible cords disposable on the periphery thereof, a tank having plastic material through which said cords may pass when supported by said drum, means whereby material is drawn on to said drum and cords in varying thicknesses when passed through the material, and means for removing the cords and formed shingles from the drum while preserving their shape after passing through said tank.

38. A machine for forming articles from plastic material, comprising means forming an endless supporting surface having drainage passages therein, a filtering cloth disposable over said passages, endless cords disposable on said cloth, a plastic material tank through which said endless members may pass when in cooperation with each other, whereby material will be drawn to said members in a unitary mass of desired shape, and means for removing said cords from said filtering cloth after the article is formed while preserving its shape.

39. A machine for forming articles from plastic material, comprising means forming an endless supporting surface, endless cords supported thereby, means for forming a plastic article in a unitary mass of desired shape on said cords when the latter is in cooperation with said supporting surface, and means for thereafter separating said cords from said surface and ejecting the formed plastic article from said cords while preserving its shape.

40. A machine for forming articles from plastic material, comprising a drum having drainage passages in the periphery thereof, a filtering cloth disposed over said passages, endless flexible cords engageable with the drum periphery, means for directing the cords from and on to the drum periphery, whereby plastic material will be deposited thereon while in contact with said drum, and said articles may be removed from said strip when the latter is free of the drum periphery.

41. A machine for forming articles from plastic material, comprising a drum having flexible spaced cords thereon, means for placing plastic material in a unitary mass of desired shape on said drum over said cords, a flexible presser belt adapted to overlie said cords and drum after the plastic material has been placed on said drum, pressing rollers engaging said belt, and means for discharging the plastic articles as a unit from said cords after said pressing belt disengages the cords and drum while preserving their shape.

42. A machine for forming articles from plastic material, comprising continuously moving cords, means for placing plastic material over said cords in a unitary mass of desired shape during continuous movement thereof, means for pressing the same, means for discharging the pressed article while preserving its shape, and means for drawing excessive water from the articles when disposed on said cords.

43. A machine for forming articles from plastic material, comprising a tank, a drum forming said plastic material into a unitary mass of desired shape, and cords supported on the periphery thereof and movable with said drum through plastic material in said tank adapted to remove said mass as a unit while preserving its shape.

44. A machine for forming articles from plastic material, comprising a member having a supporting surface forming said plastic material into a unitary mass of desired shape, a vacuum passage extending therethrough, flexible cords adapted to be supported on said surface and adapted to remove said mass as a unit while preserving its shape, and means for subjecting the cords to sub-atmospheric pressure, thereby causing said flexible cords to be held more closely to the supporting surface.

45. A machine for forming articles from plastic material, comprising a supporting member for forming said plastic material into a unitary mass of desired shape and cords carried thereby adapted to remove said mass as a unit while preserving its shape, and means for subjecting the same successively to different degrees of sub-atmospheric pressure, and finally to atmospheric pressure.

In testimony whereof I affix my signature.

FRANK W. YOUNG.